(12) United States Patent
Hart et al.

(10) Patent No.: US 7,440,976 B2
(45) Date of Patent: Oct. 21, 2008

(54) METHOD AND APPARATUS FOR PERFORMING COLLABORATIVE SEARCHES

(75) Inventors: Matt E. Hart, Lunenburg, MA (US);
Arno Grbac, West Newton, MA (US);
Damon Levy, Cambridge, MA (US)

(73) Assignee: Intuit Inc., Mountain View, CA (US)

( * ) Notice: Subject to any disclaimer, the term of this patent is extended or adjusted under 35 U.S.C. 154(b) by 283 days.

(21) Appl. No.: 11/387,254

(22) Filed: Mar. 22, 2006

(65) Prior Publication Data

US 2007/0226183 A1    Sep. 27, 2007

(51) Int. Cl.
*G06F 17/00* (2006.01)
(52) U.S. Cl. .............. 707/104.1; 707/101; 707/102; 707/103 R
(58) Field of Classification Search .......... 707/1–10, 707/100–104.1, 200–206
See application file for complete search history.

(56) References Cited

U.S. PATENT DOCUMENTS

2006/0129533 A1*   6/2006  Purvis ........................ 707/3

* cited by examiner

*Primary Examiner*—Isaac M Woo
(74) *Attorney, Agent, or Firm*—Park Vaughan & Fleming LLP

(57) ABSTRACT

One embodiment of the present invention provides a collaborative-search system that facilitates performing collaborative searches. During operation, the collaborative-search system receives a first search request from a first user. The collaborative-search system then identifies a group of users who sent search requests that were similar to the first search request. Next, the collaborative-search system sends a notification to the first user that identifies the group of users that sent search requests that were similar to the first search request. If the collaborative-search system receives a request from the first user to view a search history for the group of users, the collaborative-search system sends the search history to the first user.

23 Claims, 6 Drawing Sheets

USER INTERFACE FOR APPLICATION 300

File  Edit  View  Lists  Professional  Company  Customers  Vendors  Employees  Banking  Reports  Window  Help

COLLABORATION 302

15 PEOPLE ON THIS FORM

2 FRIENDS ON THIS FORM
3 HELPERS ON THIS FORM
10 OTHERS ON THIS FORM

12 FRIENDS AVAILABLE
27 HELPERS AVAILABLE
170 OTHERS AVAILABLE

[ SEARCH ] — 353

CHAT: | HELPERS | FRIENDS

USER1: HOW DO I ADD A NEW CUSTOMER TO THE CUSTOMER LIST?

USER2: IF YOU RIGHT-CLICK ON A CUSTOMER, YOU WILL FIND AN OPTION THAT SAYS "NEW" WHICH WILL LET YOU ADD A NEW CUSTOMER.

377

OKAY, I WILL TRY THAT. THANK YOU.

[ OPTIONS ] [ SEND ]

Customer: Job List

| Name | Balance Total | Notes | Job Status |
|---|---|---|---|
| Intuit | $10,000.00 | | |
| INTU-0001 | $2,000.00 | | |
| INTU-0002 | $3,000.00 | | |
| INTU-0007 | $5,000.00 | | |
| Xyz-Corporation | $75,253.12 | | |
| XYZ-1010 | $4,567.44 | | |
| XYZ-1099 | $0.00 | | |
| XYZ-1233 | | | |
| XYZ-1289 | $456.00 | | |
| XYZ-1299 | $0.00 | | |
| XYZ-1354 | $550.00 | | |
| XYZ-1541 | $0.00 | | |
| XYZ-1599 | $0.00 | | |
| XYZ-1688 | | | |
| XYZ-2020 | $0.00 | | |
| XYZ-2021 | $12,354.00 | | |
| XYZ-2021-B | $15,125.25 | | |

FIG. 3

METHOD AND APPARATUS FOR PERFORMING COLLABORATIVE SEARCHES

BACKGROUND

1. Related Art

The present invention relates to computer-based systems that facilitate searching for information. More specifically, the present invention relates to a method for performing collaborative searches.

Typically, searching for information on a computer system is a solitary process. If a user knows exactly where to search and knows the precise keywords to use for the search, then the searching process is usually short and the user can quickly find the information he or she needs. However, in many cases the searching process is more complicated. Often the user does not know exactly where to search, and in many cases, the user must refine the keywords used to perform the search before finding the desired information. In some cases, the might never obtain the correct term to search on, and may consequently fail to find the desired information.

A user who needs specific information and does not have time to perform an exhaustive search might ask a co-worker for the information, or for related information that can help the user to find the desired information. If a co-worker does not know the desired information, the co-worker can offer to help the user in searching for the desired information. However, if two users search for the same information, the time and effort required to perform the search is not necessarily reduced by half. Because the user and the co-worker might be unaware of each other's search efforts, both users may spend time examining the same search results. Presently, the only method for preventing both users from examining the same search results is for both users to continuously communicate with each other about which information sources they have visited and which information sources they plan to visit.

Additionally, many searches are duplicates of searches performed by other users. Thus, on a global scale, time is wasted by users performing searches that are similar to searches other users have previously performed.

SUMMARY

One embodiment of the present invention provides a collaborative-search system that facilitates performing collaborative searches. During operation, the collaborative-search system receives a first search request from a first user. The collaborative-search system then identifies a group of users who sent search requests that were similar to the first search request. Next, the collaborative-search system sends a notification to the first user that identifies the group of users that sent search requests that were similar to the first search request. If the collaborative-search system receives a request from the first user to view a search history for the group of users, the collaborative-search system sends the search history to the first user.

In a variation on this embodiment, the collaborative-search system can be installed as a stand-alone system, a stand-alone tool, a browser-integration, a web-site integration, or an application-integration.

In a variation on this embodiment, the system configures the collaborative-search system by defining a search community, wherein the group of users is a subset of the search community. Additionally, the system can specify a subset of users from the search community that can view a history of the first user. Furthermore, the system can specify a set of keywords, wherein the set of keywords relate to subjects in which the first user can help a second user find information. In addition, the system can configure a chat system, wherein the chat system allows the first user to provide assistance to the second user, or to request assistance from the second user.

In a further variation, the search community can include a global set of users, an organization, a subset of the organization, and a user-defined set of users.

In a variation on this embodiment, search requests that are similar to the first search request can include a duplicate of the first search request, a subset of the first search request, and a combination of a subset of the first search request and a new search request.

In a variation on this embodiment, the notification can specify: a number of users on the same web-page as the first user; a number of users on the same web-site as the first user; a number of users whose search requests are similar to the first search request; a number of users whose search requests at one point in time were similar to the first search request; and a number of users on the same application window as the first user.

In a variation on this embodiment, the system receives a chat request from the first user to chat with a second user, wherein the second user is identified as knowledgeable on a search topic. The system then opens a chat window, wherein the chat window enables the first user to chat with the second user.

In a variation on this embodiment, the search history is stored until: a specified length of time has elapsed (wherein the specified length of time can be user-defined, or system defined); the search effort is concluded; or the collaborative-search system is halted.

BRIEF DESCRIPTION OF THE FIGURES

FIG. 3 illustrates a user interface for an application in accordance with an embodiment of the present invention.

DETAILED DESCRIPTION

Figure 1:
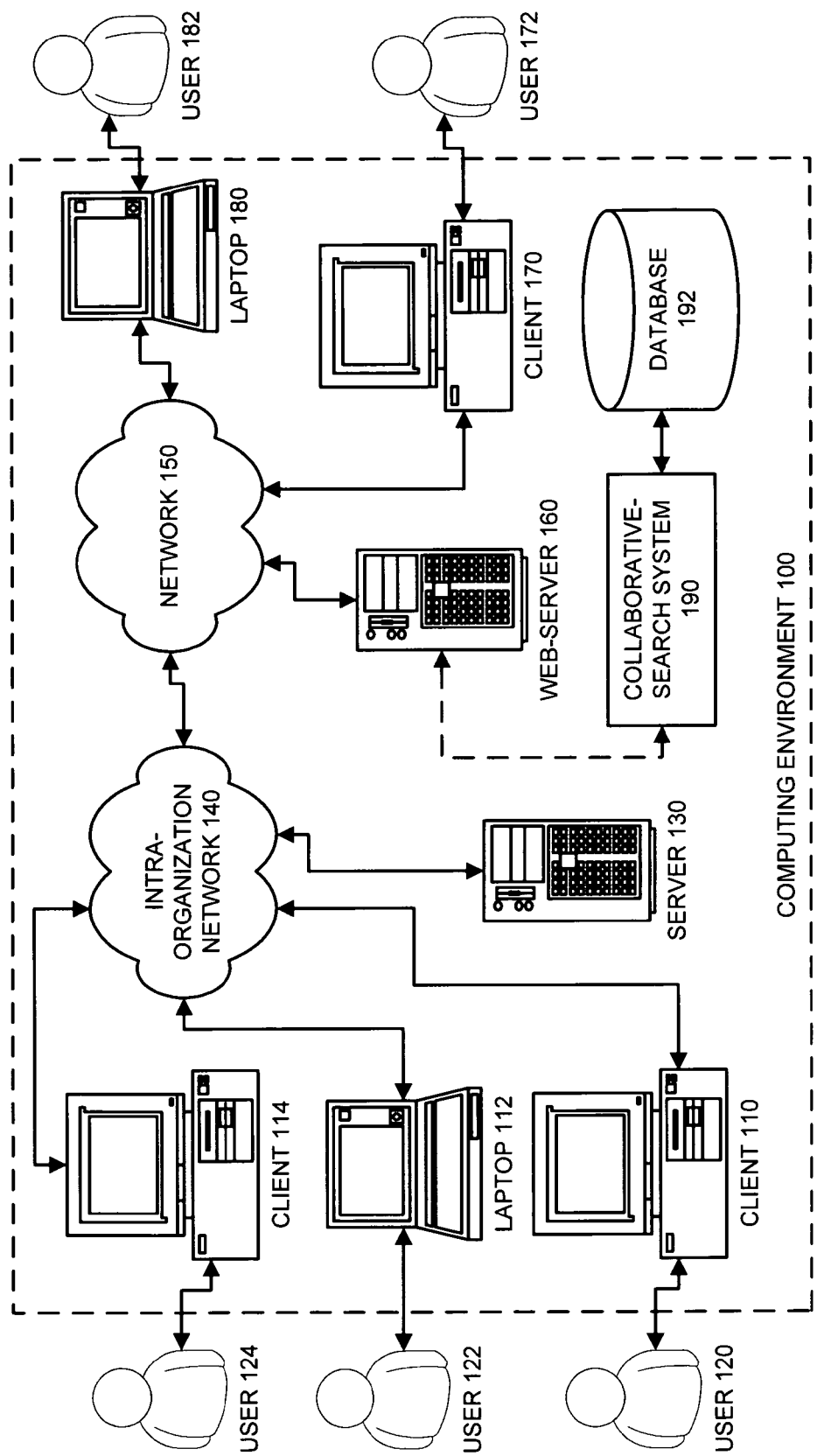
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

Often, users waste a significant amount of time searching for information other users have previously searched for. One embodiment of the present invention provides a system for collaborative searching that can eliminate some of this wasted time. A first user can enter search terms into the system, and in response to these search terms, the system can provide a list of users that have previously performed a similar search. The first user is then able to select a second user from the list of users and can view the second user's search history related to the similar search. Additionally, the first user is able to see what locations the second user has visited, as well as what terms the second user has searched for. This saves the first user the time and effort of having to refine his/her search without any assistance.

In one embodiment of the present invention, the visited locations can include web-sites, web-pages, application windows, and computer files.

In one embodiment of the present invention, users can communicate with each other via a chat-window. In this embodiment, a first user can use the chat-window to ask a second user to assist him/her to find information or to answer a question.

In one embodiment of the present invention, an expert user can specify a set of keywords to monitor. In general, the expert user believes he/she is knowledgeable enough on the subjects related to the keywords to assist a second user. If the second user performs a search that includes a word that is part of the set of keywords, the system sends the expert user a notification informing the expert user that the second user has performed a search that includes one of the keywords. In this embodiment, the expert user can communicate with the second user via a chat-window.

In one embodiment of the present invention, the notification can include an e-mail, a sound, a pop-up window, or any other method of notification. The notification can also include less obtrusive mechanisms, such as a flashing indicator within the collaborative-system window, or a mechanism that adds the name of the second user to the chat-window user-list.

Computing Environment

FIG. 1 illustrates a computing environment 100 in accordance with an embodiment of the present invention. Computing environment 100 can generally include any type of computer system, including, but not limited to, a computer system based on a microprocessor, a mainframe computer, a digital signal processor, a portable computing device, a personal organizer, a device controller, and a computational engine within an appliance. Computing environment 100 includes client 110, laptop 112, client 114, server 130, intra-organization network 140, network 150, web-server 160, client 170, laptop 180, collaborative-search system 190, and database 192.

Clients 110, 114 and 170, and laptops 112 and 180 can generally include any node on a network including computational capability and including a mechanism for communicating across the network.

Server 130 and web-server 160 can generally include any nodes on a computer network including a mechanism for servicing requests from a client for computational and/or data storage resources. In one embodiment of the present invention, web-server 160 includes resources for hosting a web-site.

Network 150 and intra-organization network 140 can generally include any type of wired or wireless communication channel capable of coupling together computing nodes. This includes, but is not limited to, a local area network, a wide area network, or a combination of networks. In one embodiment of the present invention, network 150 includes the Internet.

Collaborative-search system 190 is a system that facilitates performing collaborative searches. In one embodiment of the present invention, collaborative-search system 190 is part of web-server 160 as illustrated by the dashed line connecting collaborative-search system 190 and web-server 160.

Database 192 can generally include any type of system for storing data in non-volatile storage. This includes, but is not limited to, systems based upon magnetic, optical, and magneto-optical storage devices, as well as storage devices based on flash memory and/or battery-backed up memory.

In one embodiment of the present invention, database 192 stores the search histories of user 120, user 122, user 124, user 172, and user 182.

In one embodiment of the present invention, database 192 is part of collaborative-search system 190.

In one embodiment of the present invention, database 192 is a stand-alone system that collaborative-search system 190 communicates with to store and retrieve the search histories of user 120, user 122, user 124, user 172, and user 182.

In one embodiment of the present invention, collaborative-search system 190 is part of multiple clients and/or servers.

In one embodiment of the present invention, collaborative-search system 190 is a stand-alone system.

In one embodiment of the present invention, collaborative-search system 190 is part of server 130.

In one embodiment of the present invention, collaborative-search system 190 is only active within an organization. For example, consider the situation where user 120 is searching for information on programming for embedded systems. In this example, also assume that user 122 and user 182 have performed numerous searches on this topic. Upon searching for information on programming for embedded systems, collaborative-search system 190 informs user 120 that user 122 has previously performed similar searches, and provides user 120 with the option to view user 122's search history. By viewing user 122's search history, user 120 might discover that user 122 concluded his/her search by searching for the search string "programming languages for modem embedded systems". User 120 can then execute a similar search to discover a web-site containing the information he/she was searching for. Note that collaborative-search system 190 does not inform user 120 that user 182 performed similar searches because user 182 is not part of the same organization as user 120.

In one embodiment of the present invention, collaborative-search system 190 allows collaboration between organizations. For example, following the previous example, but allowing collaboration between organizations, collaborative-search system 190 informs user 120 that user 182 performed similar searches, and allows user 120 the opportunity to view user 182's search history.

In one embodiment of the present invention, collaborative-search system 190 enables user 120 to communicate with user 122 or user 182. In this embodiment, user 122 and user 182 can: communicate with user 120; refuse to communicate with user 120; or indicate to collaborative-search system 190 that they do not wish to communicate with other users, in which case collaborative-search system 190 does not provide the communication option to user 120. Note that the communication between users can occur through e-mail, chat or instant message.

In one embodiment of the present invention, collaborative-search system 190 is part of web-server 160, and is only active when users visit a web-site hosted by web-server 160. In this embodiment, collaborative-search system 190 facilitates collaborative searching of the web-site hosted by web-server 160.

In one embodiment of the present invention, collaborative-search system 190 is part of an application. In this embodiment, collaborative-search system 190 facilitates collaborative searching of help files that are part of the application and web-sites that provide help information for the application. Furthermore, collaborative-search system 190 facilitates communication between a user who requires assistance with a specific feature of the application and a user who is an expert on the specific feature.

Browser-Integration

Figure 2:
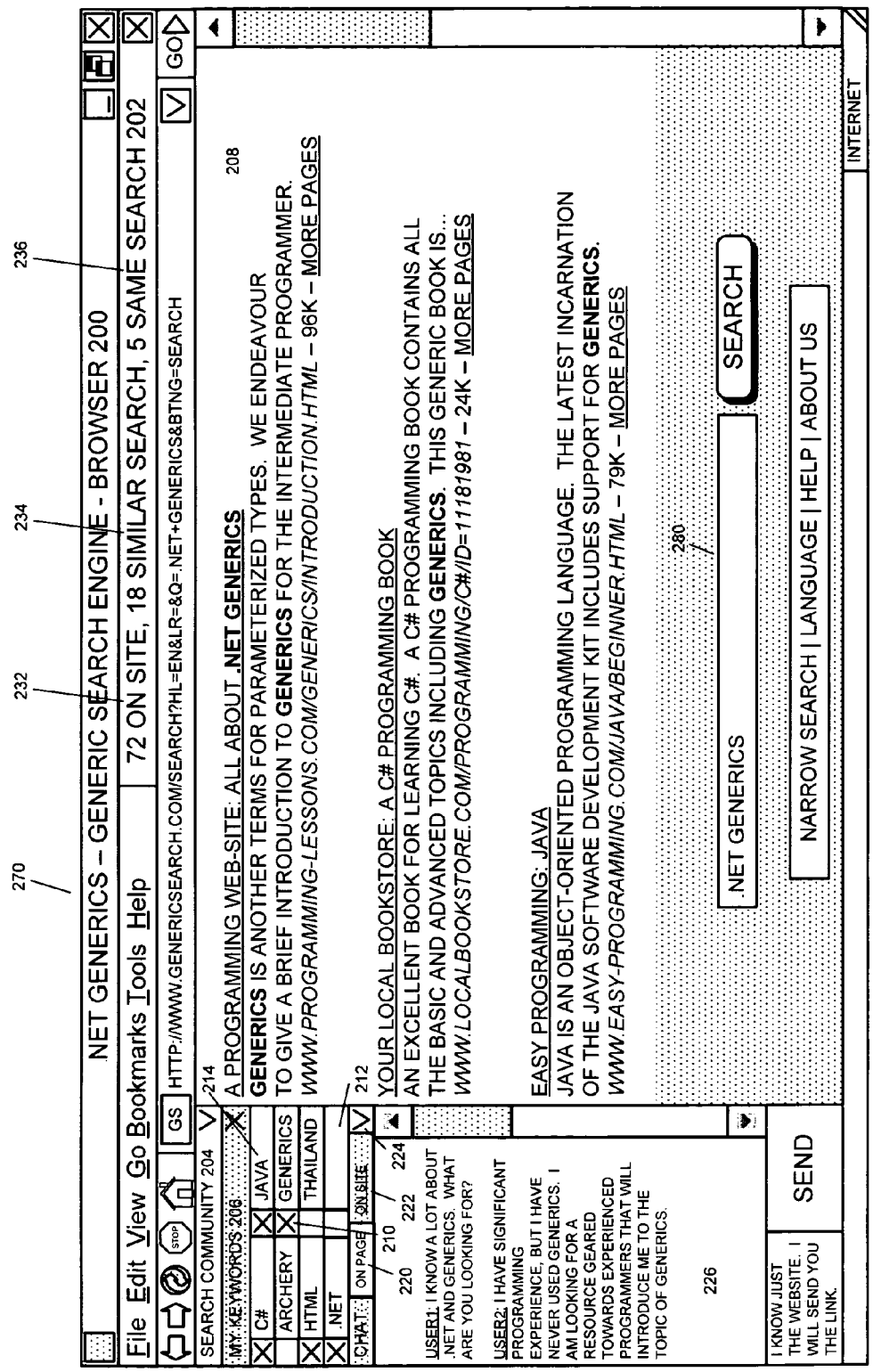
FIG. 2 illustrates a browser in accordance with an embodiment of the present invention.

FIG. 2 illustrates a browser 200 in accordance with an embodiment of the present invention. Browser 200 can generally include any type of Internet browser capable of viewing a web-site, such as the INTERNET EXPLORER™ m browser distributed by the Microsoft Corporation of Redmond, Wash. Browser 200 can also include any type of file-browser which is capable of viewing files on a client and/or server. Pane 208 illustrates user 172's search for ".net generics".

In one embodiment of the present invention, user 172 can refer to menu bar 202 to discover how many users are currently visiting the Generic Search Engine web-site, how many users have performed similar searches, and how many users have performed the same search. When the user clicks on "72 on site" 232, collaborative-search system 190 can display a list of users currently visiting the Generic Search Engine web-site. Similarly, when the user clicks on "18 similar search" 234, collaborative-search system 190 presents to user 172 a list of users who have entered similar search strings, and when the user clicks on "5 same search" 236, collaborative-search system 190 presents to user 172 a list of users who have entered the same search string.

In one embodiment of the present invention, the output "72 on site" 232 indicates to user 172 how many users who have searched for a similar search string have search histories which are available to user 172.

In one embodiment of the present invention, collaborative-search system 190 determines the search strings and search histories for user 172 and for users within search community 204 by: reading network traffic; reading the text in title 270; or reading the value in search field 280.

In one embodiment of the present invention, search community 204 indicates which users can participate in collaborative search efforts with user 172. By clicking on the drop-down indicator, user 172 can view the current search community settings and can change the current search community.

In one embodiment of the present invention, the "my keywords" 206 panel lists keywords related to subjects that user 172 is an expert in. A keyword with an 'x' next to it is a keyword that user 172 is currently monitoring and is willing to help other users find information about. For example, java 214 has an 'x' next to it indicating that user 172 can be notified by collaborative-search system 190 anytime a user within search community 204 enters a search string containing the keyword "java". A new keyword can be added by entering it into a blank text-box, such as text-box 212. Toggling a box, such as box 210, next to a keyword changes the state of the associated keyword to active or inactive.

In one embodiment of the present invention, user 172 can use chat system 226 to chat with a user. By selecting "on page" 220, user 172 can chat with any user who is currently on the same web-page as user 172 and is part of search community 204. By selecting "on site" 222, user 172 can chat with any user who is on the same web-site as user 172 and is part of search community 204. By clicking on drop-down 224, user 172 can select a user or a group of users to chat with who entered a similar search string or the same search string as a search string entered by user 172. User 172 can also select individual users to chat with who are part of search community 204.

In one embodiment of the present invention, by selecting a user, or group of users who are part of search community 204, user 172 can view the search histories of the selected user or groups of users.

In one embodiment of the present invention, the features of collaborative-search system 190 are not integrated into browser 200, but are integrated into a web-site, such as the Generic Search Engine web-site.

Application-Integration

FIG. 3 illustrates a user interface for application 300 in accordance with an embodiment of the present invention. Collaboration 302 indicates the status of other people who are using application 333. Collaboration 302 illustrates the number of people viewing form 393 and how many of these people are friends, helpers, or other. "Helpers" are users hired by an organization to provide assistance with using application 333. Collaboration 302 also indicates: how many friends are using application 333; how many helpers are available for application 333; and how many other users are using application 333.

In one embodiment of the present invention, "helpers" are self-selected as willing to provide assistance with using application 333.

In one embodiment of the present invention, user 120 can execute a search for help on a topic by utilizing search field 353. In this embodiment, user 120 can receive a notification identifying users who have performed similar searches to a search entered into search field 353.

Suppose user 120 needs help in adding a new customer to form 393. In one embodiment of the present invention, user 120 can use chat system 377, which is part of collaborative-search system 190, to ask the helpers how add a new customer to form 393.

Installation/Configuration

Figure 4:
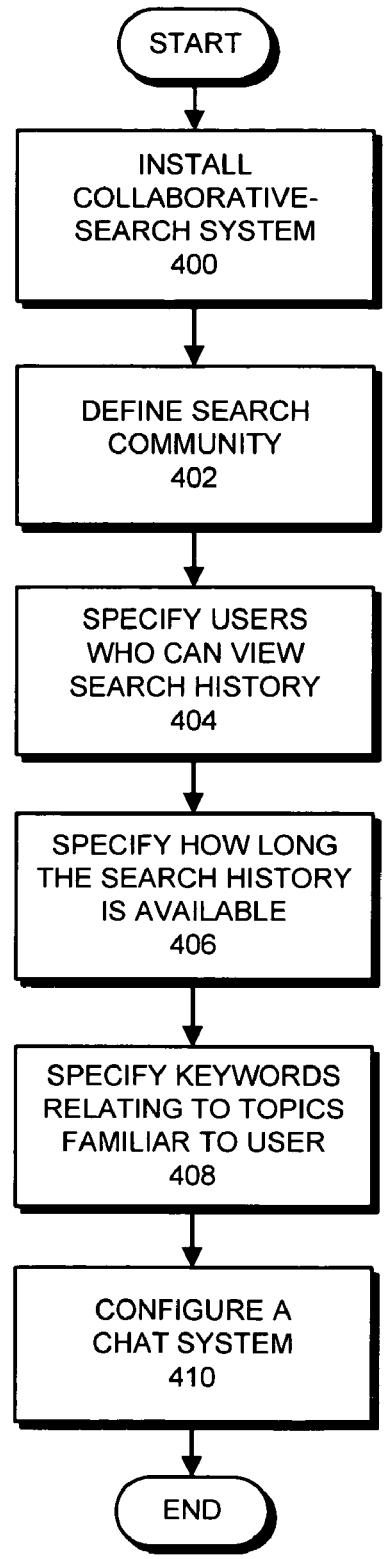
FIG. 4 presents a flowchart illustrating the process of installing and configuring a collaborative-search system in accordance with an embodiment of the present invention.

FIG. 4 presents a flowchart illustrating the process of installing and configuring a collaborative-search system in accordance with an embodiment of the present invention. The process begins when collaborative-search system 190 is installed (step 400). In one embodiment of the present invention, collaborative-search system 190 can be installed as a stand-alone system, a stand-alone tool or application, a browser-integration, a web-site integration, or an application-integration.

In one embodiment of the present invention, user 120 can define a search community (step 402). This search community can include a global set of users, an organization, a subset of an organization, or any user-defined set of users. User 120 can also specify which users within the search community can view user 120's search history (step 404).

In one embodiment of the present invention, user 120 specifies how long user 120's search history is available (step 406). Collaborative-search system 190 can then save the search history for a specified length of time, until user 120's search effort has concluded, or until collaborative-search system 190 is halted.

In one embodiment of the present invention, the collaborative-search system 190 specifies the length of time the search history is available to users within the search community and the subset of users within the search community who have permission to view the search history.

Next, user 120 specifies keywords related to topics that user 120 is an expert in (step 408). If collaborative-search system 190 detects the use of a keyword which is selected for monitoring, collaborative-search system 190 notifies user 120 of the use of the keyword. User 120 can then assist the user who used the keyword.

Finally, user 120 can configure a chat system to interact with users through collaborative-search system 190 (step 410). This can involve specifying who has permission initiate chat with user 120.

In one embodiment of the present invention, steps 402-410 are optional.

Executing a Search Request

Figure 5:
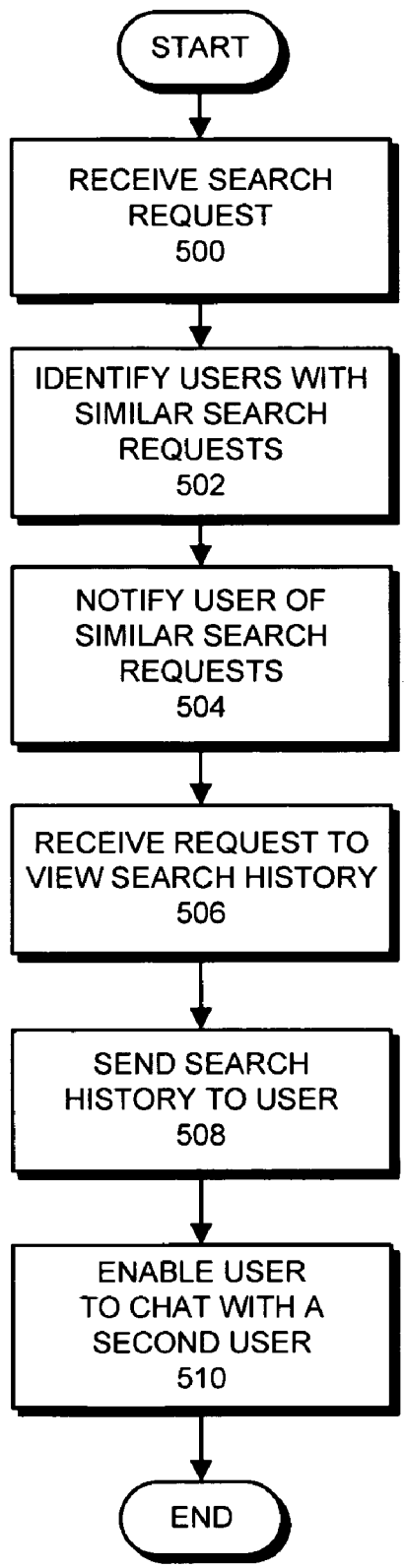
FIG. 5 presents a flowchart illustrating the process of executing a search request in accordance with an embodiment of the present invention.

FIG. 5 presents a flowchart illustrating the process of executing a search request in accordance with an embodiment of the present invention. This process begins when collaborative-search system 190 receives a search request from user 120 (step 500).

In one embodiment of the present invention, receiving a search request from user 120 includes storing both the search request and the results of the search request in database 192.

Next, collaborative-search system 190 identifies users with similar search requests to the search request received from user 120 (step 502). In one embodiment of the present invention, the similar search request can be: the same as the search request received from user 120; a subset of the search request received from user 120; or a combination of a subset of the search request received from user 120 and a new search request.

Collaborative-search system 190 then notifies user 120 of the users who had similar search requests as the search request received from user 120 (step 504). In one embodiment of the present invention, the notification can include: the number of users on a web-page; the number of users on a web-site (wherein a web-site is a collection of web-pages); the number of users whose search requests were similar to user 120's search request; the number of users whose search requests at one point in time were similar to user 120's search request; the number of users using an application; the number of users on an application-window; and the number of users who are experts or helpers.

In one embodiment of the present invention, the notification can be in the form of a pop-up window, a frame within browser 200, a menu bar 202, or a button that when clicked brings up a dialog box containing the notification.

Next, collaborative-search system 190 receives a request from user 120 to view the search history of a user (step 506). In response, collaborative-search system 190 sends user 120 the search history of the user (step 508).

In one embodiment of the present invention, the search history is retrieved from database 192.

In one embodiment of the present invention, the search history can include images of the pages viewed by a user. This is advantageous because user 120 can skim through all the results that the user thought would give the information they were seeking without having to browse to each page that the user visited.

In one embodiment of the present invention, the search history can include links to the pages viewed by a user.

In one embodiment of the present invention, the search history includes the search strings used to perform a search and the refinements made to the search strings during the iterations of the search process.

In one embodiment of the present invention, the user's search history is included in the notification sent to user 120 in step 504.

In one embodiment of the present invention, user 120 can request, and can subsequently receive, the search history from a group of users with search requests similar to user 120's search request.

Finally, collaborative-search system 190 can enable user 120 to chat with a user who is part of user 120's search community (step 510).

Application Assistance

Figure 6:
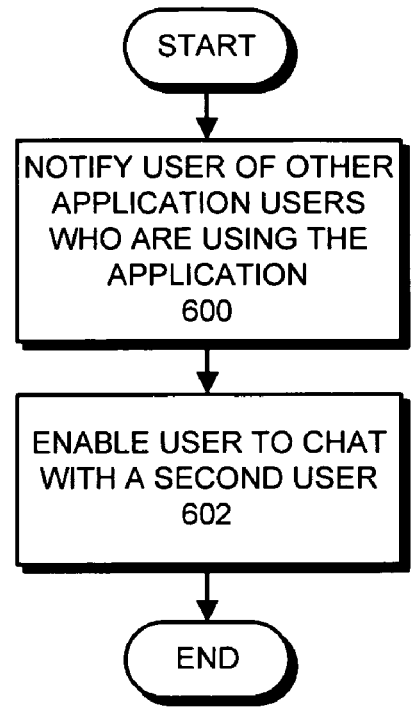
FIG. 6 presents a flowchart illustrating the process of obtaining assistance with an application in accordance with an embodiment of the present invention.

FIG. 6 presents a flowchart illustrating the process of obtaining assistance with an application in accordance with an embodiment of the present invention. The process begins when collaborative-search system 190 notifies user 120 of other users who are in the process of using application 333 (step 600). In one embodiment of the present invention, the notification can be in the form of a pop-up window, a frame within application 333 such as collaboration 302, a menu bar 202, or a button that when clicked brings up a dialog box containing the notification.

In one embodiment of the present invention, the notification includes: the number of people using application 333; the number for friends using application 333; the number of helpers using application 333; the number of people using a particular part of application 333; the number of friends using a particular part of application 333; and the number of helpers using a particular part of application 333.

Then, collaborative-search system 190 can enable user 120 to chat with a user using application 333 (step 602).

In one embodiment of the present invention, user 120 can chat with a group of users. For example, user 120 can chat with all of the friends of user 120 who are working with the same part of application 333.

In one embodiment of the present invention, user 120 can perform a search for help or information in application 333 using search field 353.

Search Assistance

Figure 7:
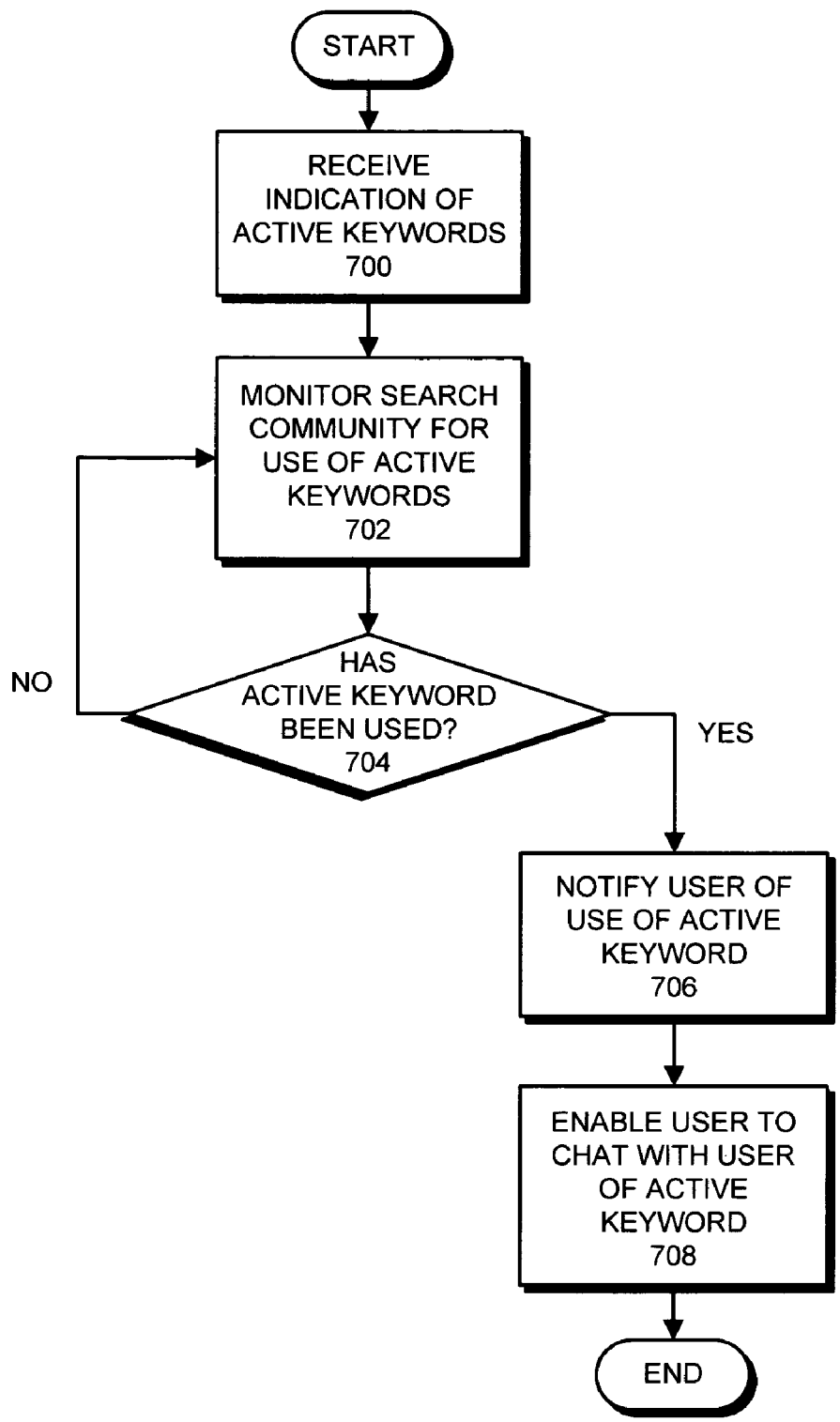
FIG. 7 presents a flowchart illustrating the process of providing search assistance in accordance with an embodiment of the present invention.

FIG. 7 presents a flowchart illustrating the process of providing search assistance in accordance with an embodiment of the present invention. The process begins when collaborative-search system 190 receives active keywords from user 120 (step 700). Collaborative-search system 190 then monitors a search community for usage of the active keywords (step 702). Next, collaborative-search system 190 determines if an active keyword has been used (step 704). If not, the process returns to step 702. If so, collaborative-search system 190 notifies user 120 of the use of an active keyword (step 706).

In one embodiment of the present invention, notifying user 120 of the use of an active keyword involves informing user 120 about the user who used the active keyword.

Finally, collaborative-search system 190 enables user 120 to chat with the user who used the active keyword (step 708).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclo-

What is claimed is:

1. A method for performing a collaborative search, the method comprising:
   receiving a first search request from a first user at a collaborative-search system;
   identifying a group of users that sent search requests that were similar to the first search request;
   sending a notification to the first user, wherein the notification identifies the group of users that sent search requests that were similar to the first search request;
   upon receiving a request from the first user to view a search history for the group of users, sending the search history for the group of users to the first user; and
   further comprising configuring the collaborative-search system, wherein configuring the collaborative-search system involves:
      defining a search community, wherein the group of users is a subset of the search community,
      specifying a subset of users from the search community that can view a search history of the first user, and
      specifying a set of keywords, wherein the set of keywords relate to subjects that the first user can help a second user find information on.

2. The method of claim 1, further comprising installing the collaborative-search system, wherein the collaborative-search system is installed as:
   a stand-alone system;
   a stand-alone tool;
   a browser-integration;
   a web-site integration; or
   an application-integration.

3. The method of claim 1, wherein configuring the collaborative-search system further involves configuring a chat system, wherein the chat system allows the first user to provide assistance to the second user, or request assistance from the second user.

4. The method of claim 3, wherein the search community can include:
   a global set of users;
   an organization;
   a subset of the organization; and
   a user-defined set of users.

5. The method of claim 1, wherein search requests that are similar to the first search request can include:
   a duplicate of the first search request;
   a subset of the first search request; and
   a combination of a subset of the first search request and a new search request.

6. The method of claim 1, wherein the notification can specify:
   a number of users on a web-page;
   a number of users on a web-site;
   a number of users whose search requests are similar to the first search request;
   a number of users whose search requests at one point in time were similar to the first search request; and
   a number of users on an application window.

7. The method of claim 1, further comprising enabling the first user to monitor a second user's search efforts by displaying a window to the first user that the second user is viewing.

8. The method of claim 1, further comprising:
   receiving a chat request from the first user to chat with a second user, wherein the second user is identified as knowledgeable on a search topic; and
   opening a chat window, wherein the chat window enables the first user to chat with the second user.

9. The method of claim 1, wherein the search history is stored until:
   a specified length of time is reached, wherein the specified length of time can be user-defined, or system-defined;
   a search effort is concluded; or
   the collaborative-search system is halted.

10. A computer-readable storage medium storing instructions that when executed by a computer cause the computer to perform a method for performing a collaborative search, the method comprising:
    receiving a first search request from a first user at a collaborative-search system;
    identifying a group of users that sent search requests that were similar to the first search request;
    sending a notification to the first user, wherein the notification identifies the group of users that sent search requests that were similar to the first search request;
    upon receiving a request from the first user to view a search history for the group of users, sending the search history for the group of users to the first user; and
    wherein the method further comprises configuring the collaborative-search system, and wherein configuring the collaborative-search system involves:
       defining a search community, wherein the group of users is a subset of the search community,
       specifying a subset of users from the search community that can view a search history of the first user, and
       specifying a set of keywords, wherein the set of keywords relate to subjects that the first user can help a second user find information on.

11. The computer-readable storage medium of claim 10, wherein the method further comprises installing the collaborative-search system, and wherein the collaborative-search system is installed as:
    a stand-alone system;
    a stand-alone tool;
    a browser-integration;
    a web-site integration; or
    an application-integration.

12. The computer-readable storage medium of claim 10, wherein configuring the collaborative-search system further involves
    configuring a chat system, wherein the chat system allows the first user to provide assistance to the second user, or request assistance from the second user.

13. The computer-readable storage medium of claim 12, wherein the search community can include:
    a global set of users;
    an organization;
    a subset of the organization; and
    a user-defined set of users.

14. The computer-readable storage medium of claim 10, wherein search requests that are similar to the first search request can include:
    a duplicate of the first search request;
    a subset of the first search request; and
    a combination of a subset of the first search request and a new search request.

15. The computer-readable storage medium of claim 10, wherein the notification can specify:
    a number of users on a web-page;
    a number of users on a web-site;
    a number of users whose search requests are similar to the first search request;

a number of users whose search requests at one point in time were similar to the first search request; and a number of users on an application window.

16. The computer-readable storage medium of claim 10, wherein the method further comprises enabling the first user to monitor a second user's search efforts by displaying a window to the first user that the second user is viewing.

17. The computer-readable storage medium of claim 10, wherein the method further comprises:

receiving a chat request from the first user to chat with a second user, wherein the second user is identified as knowledgeable on a search topic; and opening a chat window, wherein the chat window enables the first user to chat with the second user.

18. The computer-readable storage medium of claim 10, wherein the search history is stored until:

a specified length of time is reached, wherein the specified length of time can be user-defined, or system-defined;

a search effort is concluded; or the collaborative-search system is halted.

19. A computer system that performs a collaborative search, comprising:

a collaborative-search system;

a receiving mechanism within the collaborative-search system configured to receive a first search request from a first user at a collaborative-search system;

an identifying mechanism within the collaborative-search system configured to identify a group of users that sent search requests that were similar to the first search request;

a sending mechanism within the collaborative-search system configured to send a notification to the first user, wherein the notification identifies the group of users that sent search requests that were similar to the first search request;

wherein the receiving mechanism is further configured to receive a request from the first user to view a search history for the group of users;

wherein the sending mechanism is further configured to send the search history for the group of users to the first user; and further comprising a configuration mechanism designed to configure the collaborative-search system, wherein configuring the collaborative-search system involves:

defining a search community, wherein the group of users is a subset of the search community, specifying a subset of users from the search community that can view a search history of the first user, and specifying a set of keywords, wherein the set of keywords relate to subjects that the first user can help a second user find information on.

20. The computer system of claim 19, further comprising an installation mechanism configured to install the collaborative-search system, wherein the collaborative-search system is installed as:

a stand-alone system;

a stand-alone tool;

a browser-integration;

a web-site integration; or an application-integration.

21. The computer system of claim 19, wherein configuring the collaborative-search system further involves configuring a chat system, wherein the chat system allows the first user to provide assistance to the second user, or request assistance from the second user.

22. The computer system of claim 19, further comprising a monitoring mechanism configured to enable the first user to monitor a second user's search efforts by displaying a window to the first user that the second user is viewing.

23. The computer system of claim 19, further comprising:

a receiving mechanism configured to receive a chat request from the first user to chat with a second user, wherein the second user is identified as knowledgeable on a search topic; and an opening mechanism configured to open a chat window, wherein the chat window enables the first user to chat with the second user.

* * * * *